US006616133B1

(12) United States Patent
Wheeler et al.

(10) Patent No.: US 6,616,133 B1
(45) Date of Patent: Sep. 9, 2003

(54) LINEAR ACTUATOR HAVING AN ADJUSTABLE PISTON ROD

(75) Inventors: Timothy Wheeler, Shelby Township, MI (US); Wayne Morroney, Troy, MI (US)

(73) Assignee: Norgren Automotive, Inc., Clinton Township, MI (US)

( * ) Notice: Subject to any disclaimer, the term of this patent is extended or adjusted under 35 U.S.C. 154(b) by 0 days.

(21) Appl. No.: 09/908,324

(22) Filed: Jul. 18, 2001

(51) Int. Cl.[7] .................................................. B23Q 3/08
(52) U.S. Cl. .......................................................... 269/32
(58) Field of Search ............................ 92/13; 254/93 R, 254/93 H; 269/32, 25, 27, 204; 248/354.1

(56) References Cited

U.S. PATENT DOCUMENTS 1,229,951 A * 6/1917 Hatch .......................... 254/134
1,624,151 A * 4/1927 Shevlin ..................... 254/93 H
1,784,116 A * 12/1930 Shevlin ..................... 254/93 H
3,028,142 A * 4/1962 Friesen ..................... 248/354.1
3,589,757 A * 6/1971 Mooney .................. 248/354.1
3,824,861 A * 7/1974 Goebel ...................... 254/93 H
3,851,856 A * 12/1974 Berg ......................... 254/93 R
3,865,341 A * 2/1975 Fortnam et al. ............ 248/404
4,637,597 A 1/1987 McPherson
4,905,973 A 3/1990 Blatt
5,171,001 A 12/1992 Sawdon
5,215,295 A 6/1993 Hoover
5,380,056 A * 1/1995 Wu .......................... 254/93 R
5,704,600 A 1/1998 Robinson
6,155,536 A * 12/2000 Digman ...................... 254/100
6,416,045 B1 * 7/2002 Morroney ................... 269/228

* cited by examiner

*Primary Examiner*—Robert C. Watson
(74) *Attorney, Agent, or Firm*—Young & Basile, P.C.

(57) ABSTRACT

A linear actuator having an adjustable piston rod for transmitting linear motion to a rotary clamp wherein the adjustable length of the piston rod corresponds to predetermined rotational angles of a clamp arm. The adjustable piston rod provides a first portion connectable to said power clamp, and a second portion connectable to a piston of the linear actuator. The first portion is fabricated from a substantially cylindrical rod having a plurality of substantially cylindrical recesses formed thereon. The second portion provides a block connected to a tubular shaft for telescopically receiving the cylindrical rod. A cam is pivotally connected to the block and provides an aperture formed therein for receiving the cylindrical rod. A torsional spring biases the cam against the cylindrical rod within the cylindrical recesses formed in the rod to prohibit the rod from telescopically moving relative to the tubular shaft.

10 Claims, 4 Drawing Sheets

LINEAR ACTUATOR HAVING AN ADJUSTABLE PISTON ROD

FIELD OF THE INVENTION

The present invention relates, in general, to rotary clamps having linear actuators, and more particularly, to a rotary clamp having an adjustable piston rod that may be adjusted without the need for disassembling the rotary clamp.

BACKGROUND OF THE INVENTION

Rotary clamps are known of the type in which linear actuator reciprocating movement is adapted to be translated into rotary movement of a clamp arm. The linear actuator is typically powered by a fluid motor, and a linkage assembly is provided that converts the linear actuator movement into rotary motion of the clamp arm. The linear motion of the linear actuator is often transmitted to the linkage assembly by a piston rod. It is known to provide a threaded engagement between the end of the piston rod and the linkage assembly so that the length of the piston rod and the linkage assembly can be incrementally adjusted to a predetermined rotational angle of the clamp arm. This often requires repeated gauging and measurement of the clamp arm to ensure that the piston rod has been properly adjusted. In addition, the amount of adjustment is limited to the amount of the threaded engagement available for adjustment.

It is also known to utilize telescopic piston rods that provide the use of a pin inserted into corresponding apertures formed in the telescopic piston rod. This known design utilizes an outer shaft connected to the linear actuator and an inner shaft connected to the linkage assembly. The inner shaft is slidably received by an elongated bore in the outer shaft. A pin is removably received by one of a plurality of corresponding apertures in the outer shaft and the inner shaft of the piston rod in order to fixedly position the outer shaft to the inner shaft at a predetermined adjustable length corresponding to a predetermined rotational angle of the clamp arm. The distinct disadvantage with this known design is that the rotary clamp must be disassembled to adjust the length of the telescopic piston rod. The need to disassemble the rotary clamp increases downtime and maintenance time and reduces productivity which are all undesirable factors in an industrial environment.

It would be desirable to provide a rotary clamp that provides for the adjustment of the clamping angle of a clamp arm without having to disassemble the rotary clamp.

SUMMARY OF THE INVENTION

The present invention overcomes the above-noted shortcomings by providing an adjustable piston rod for transmitting linear motion from a linear actuator to an internal mechanism of a rotary clamp. The adjustable length of the piston rod corresponds to predetermined rotational angles of a clamp arm wherein the length of the piston rod may be adjusted without having to disassemble the rotary clamp. The adjustable piston rod of the present invention provides a hollow tubular shaft connectable to a linear actuator. A substantially cylindrical rod having a plurality of substantially cylindrical recesses formed on the outside surface of the cylindrical rod is received within the tubular shaft in a telescopic fashion. A cam is pivotally connected to the tubular shaft and provides an aperture formed therein for receiving the cylindrical rod. A torsional spring biases the cam against the cylindrical rod within the cylindrical recesses formed thereon to prohibit the cylindrical rod from moving telescopically relative to the tubular shaft.

Other options and features of the invention will become apparent by reference to the following specifications and to the drawings.

BRIEF DESCRIPTION OF THE DRAWINGS

In the drawings, like reference numerals refer to similar elements, throughout the various views.

DESCRIPTION OF THE PREFERRED EMBODIMENT

Figure 1:
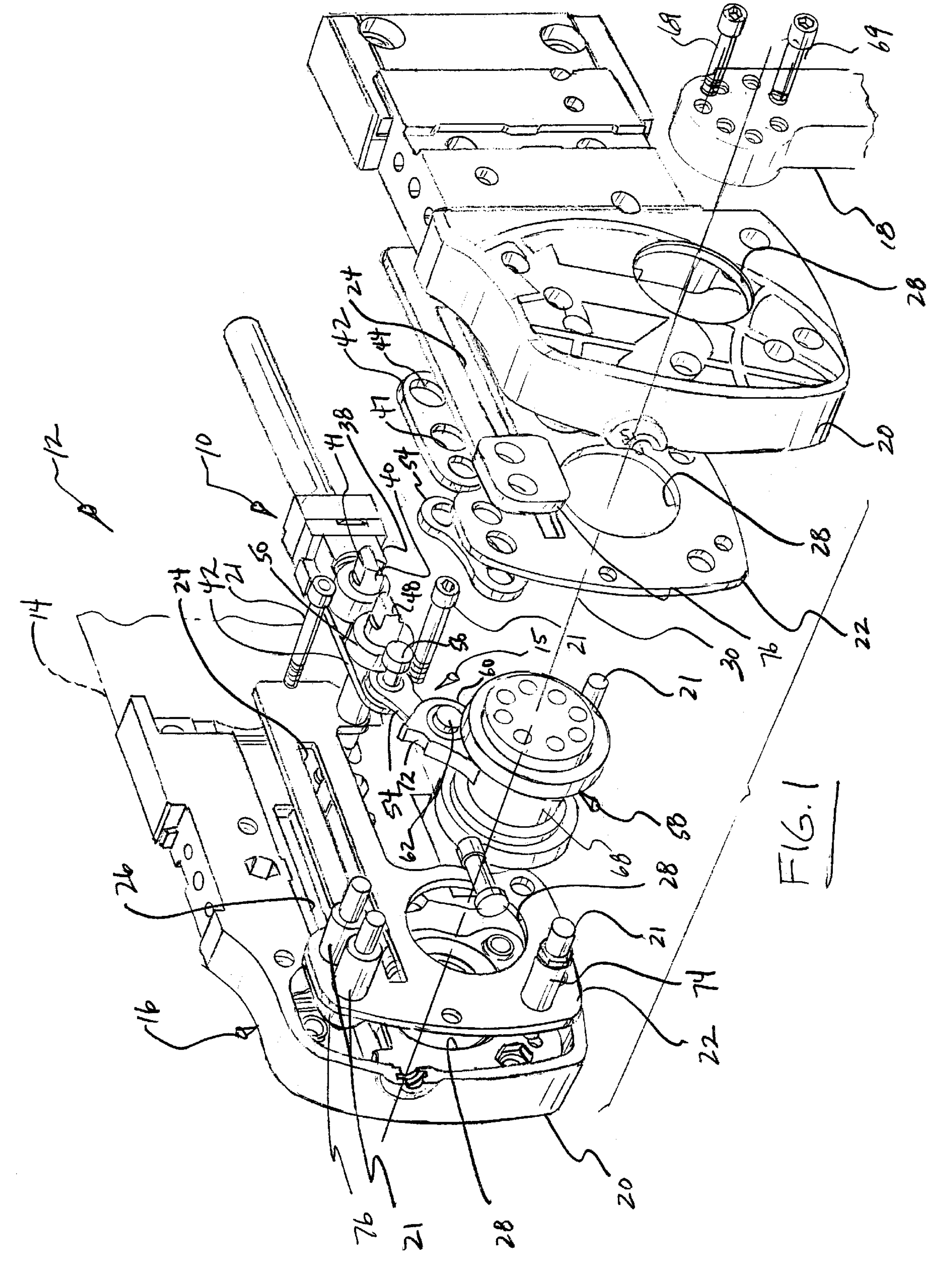
FIG. 1 is an exploded view of the rotary clamp utilizing the adjustable piston rod of the present invention.

Referring to the drawings, the present invention will now be described in detail with reference to the preferred embodiment.

Figure 2:
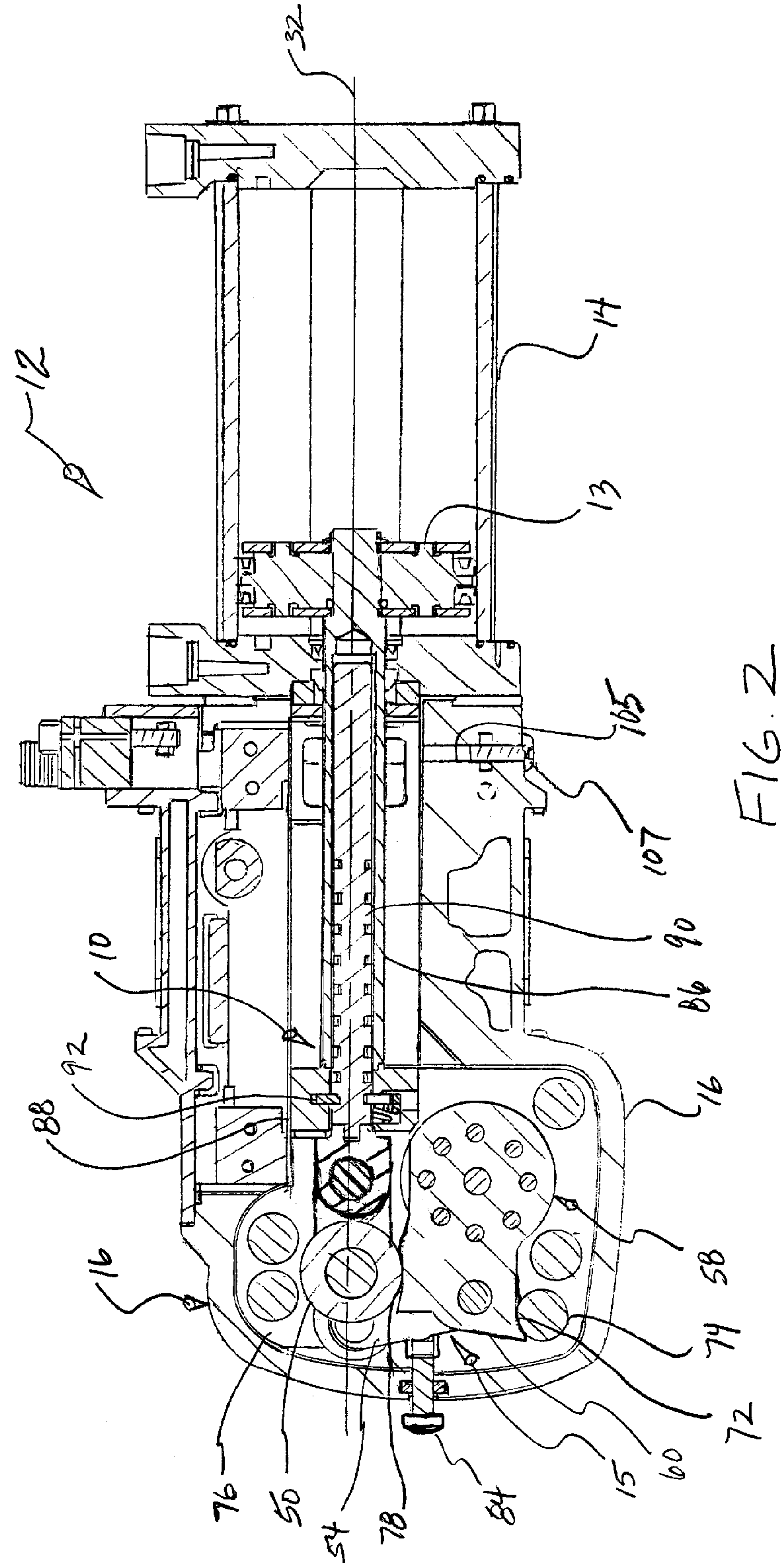
FIG. 2 is a sectional view of the rotary clamp utilizing the adjustable piston rod of the present invention.

FIGS. 1–5 illustrate a linear actuator 14 having an adjustable piston rod 10 as defined by the present invention. As seen in FIGS. 1–2, the piston rod 10 is utilized within a rotary clamp 12 which is actuated by means of the linear actuator or fluid cylinder 14. The linear actuator 14 houses a piston 13 which is attached to an end of the piston rod 10. The fluid cylinder or linear actuator 14 is preferably pneumatic, but the fluid cylinder or linear actuator 14 may also be hydraulic. The linear actuator 14 provides linear reciprocating movement to the piston 13 which, in turn, drives the piston rod 10 in a linearly reciprocating fashion. The piston rod 10 is coupled to a linkage assembly 15 disposed within a housing 16 of the rotary clamp 12. The linkage assembly 15 converts the linear motion of the piston rod 10 into rotary motion of a clamp arm 18. The reciprocal linear movement of the linear actuator 14 and piston rod 10 correspond to reciprocal rotary movement of the clamp arm 18 between a clamped position and an unclamped position.

The housing 16 of the rotary clamp 12 is formed by two bilateral halves 20 wherein one end of the housing 16 is attached to the linear actuator 14. The two halves 20 of the housing 16 form a hollow portion having a pair of laminated plates 22 disposed therein. Each of the laminated plates 22 provide an elongated guide slot 24 that is aligned with an elongated guide slot 26 formed in the inner surface of the two halves 20 of the housing 16. The two halves 20 of the housing 16 and the pair of laminated plates 20 are connected together by fasteners 21. The one end of the housing 16 connected to the linear actuator 14 is open to receive the free end of the piston rod 10. The housing 16 also includes a series of coaxial apertures 28 extending through the two halves 20 and the laminated plates 22 of the housing 16. The coaxial apertures 28 have a common axis 30 offset from and substantially perpendicular to a longitudinal axis 32 of the guide slots 24, 26.

To connect the adjustable piston rod 10 to the linkage assembly 15, a rod end 38 having a U-shaped block structure threadingly engages and receives a stem-like portion of the free end of the piston rod 10. A pin 40 extends through an aperture provided in the rounded end of the U-shaped portion of the rod end 38. Each end of the pin 40 has substantially flat parallel landings 41 that engage the elongated guide slots 24, 26 of the housing 16. The pin 40 is pivotally connected to a pair of substantially parallel linkage members 42 wherein each linkage member 42 has apertures 44 for receiving the pin 40. The apertures 44 may also be elongated (not shown) to allow for movement of the pin 40 within aperture 44 during movement of the rotary clamp 12 between the clamped and unclamped position. The linkage members 42 also provide a second aperture 47 for receiving a second pin 48 similar to pin 40. Pin 48 is received by an aperture extending through a substantially cylindrical rubber roller 50 disposed between the linkage members 42. The substantially flat landings of the pin 48 similarly engage the elongated slots 24, 26 of the housing 16 as described for pin 40.

The linkage members 42 are pivotally connected to a pair of links 54 by a pin 56 extending through corresponding apertures provided in the linkage members 42 and one end of the links 54. At the opposite end of links 54, the links 54 are pivotally connected to a shaft link 58. The shaft link includes a lever arm 60 having an aperture extending therethrough. A pin 62 is inserted through aligned apertures provided in links 54 and in the lever arm 60 of the shaft link 58.

The shaft link 58 also provides a pivot pin 68 integrally connected to the lever arm 60. The pivot pin 68 is substantially cylindrical and is rotatably disposed within the coaxial apertures 28 provided in the housing 16. The clamp arm 18 is connected to an exposed portion of the pivot pin 68 by fasteners 69. The shaft link 58 also provides a positive stop 72 integrally formed in the lever arm 60. The positive stop 72 engages a post 74 that extends between the interior walls of the housing 16. The positive stop 72 provides an arcuate surface formed therein to complement and receive the substantially circular shape of the post 74. The positive stop 72 abuts the post 74 to limit the travel of the clamp arm 18 in the clamped position. The rotary clamp 12 utilizes the rod end 38, the linkage assembly 52, and the shaft link 58 to transform reciprocal movement of the piston rod 10 into rotary movement of the clamp arm 18 between the clamped position and the unclamped position.

Even though the rotary clamp 12 is designed not to open unexpectedly upon the loss of power and/or air pressure to the linear actuator 14, it may be desirable to move the rotary clamp 12 to the unclamped position in order to release a workpiece (not shown) or reset the linkage assembly 15. To move the rotary clamp 12 toward the unclamped position during loss of power and/or air pressure, a reciprocal member 84 is slidably disposed within an aperture provided within an end wall of the housing 16, as seen in FIG. 2. The reciprocal member 84 has a cylindrical body with a pair of larger cylindrical end portions integral with the body of the reciprocal member 84. The larger end portions capture the reciprocal member 84 within the end wall of the housing 16. Reciprocal member 84 is aligned with the longitudinal axis 32 of the elongated slot 24, 26 so that the reciprocal member 84 is displaced by the linkage assembly 15 when the rotary clamp 12 is in the clamped position. If power or air is lost to the rotary clamp 12 when in the clamped position, the reciprocal member 84 may be struck from the outside of the housing 16 to move the linkage assembly 15 toward the unclamped position.

To allow the linkage assembly 15 to move to an over-center position without risking wear of the internal mechanisms of the rotary clamp 10, the present invention provides a wedging assembly that effectively wedges the linkage assembly 15 into the clamped position, as seen in FIGS. 1 and 2. This is accomplished by mounting two wear blocks 76 on the outside of the laminated plates 22 just above the guide slots 24 provided in the laminated plates 22. The wear blocks 76 engage the flat landing areas provided on pins 48, 56 when the rotary clamp 12 moves into the clamped position. Further upward pressure is applied to the pins 48, 56 against the wear block 76 by having the roller 50 roll on an inclined surface 78 provided on the lever arm 60 of the shaft link 58. The inclined surface 78 acts as a ramp by which the roller 50 may engage and roll thereon when the rotary clamp 10 is moving into the clamped position. By providing the inclined surface 78 on the lever arm 60, the roller 50 provides an increasing force on pins 40, 56 against the wear block 76 while little or no force is applied to links 54. This assures that the clamp 18 is tightly secured when in the clamped position while also assuring that no excessive wear is occurring to the linkage assembly 15.

Figure 3:
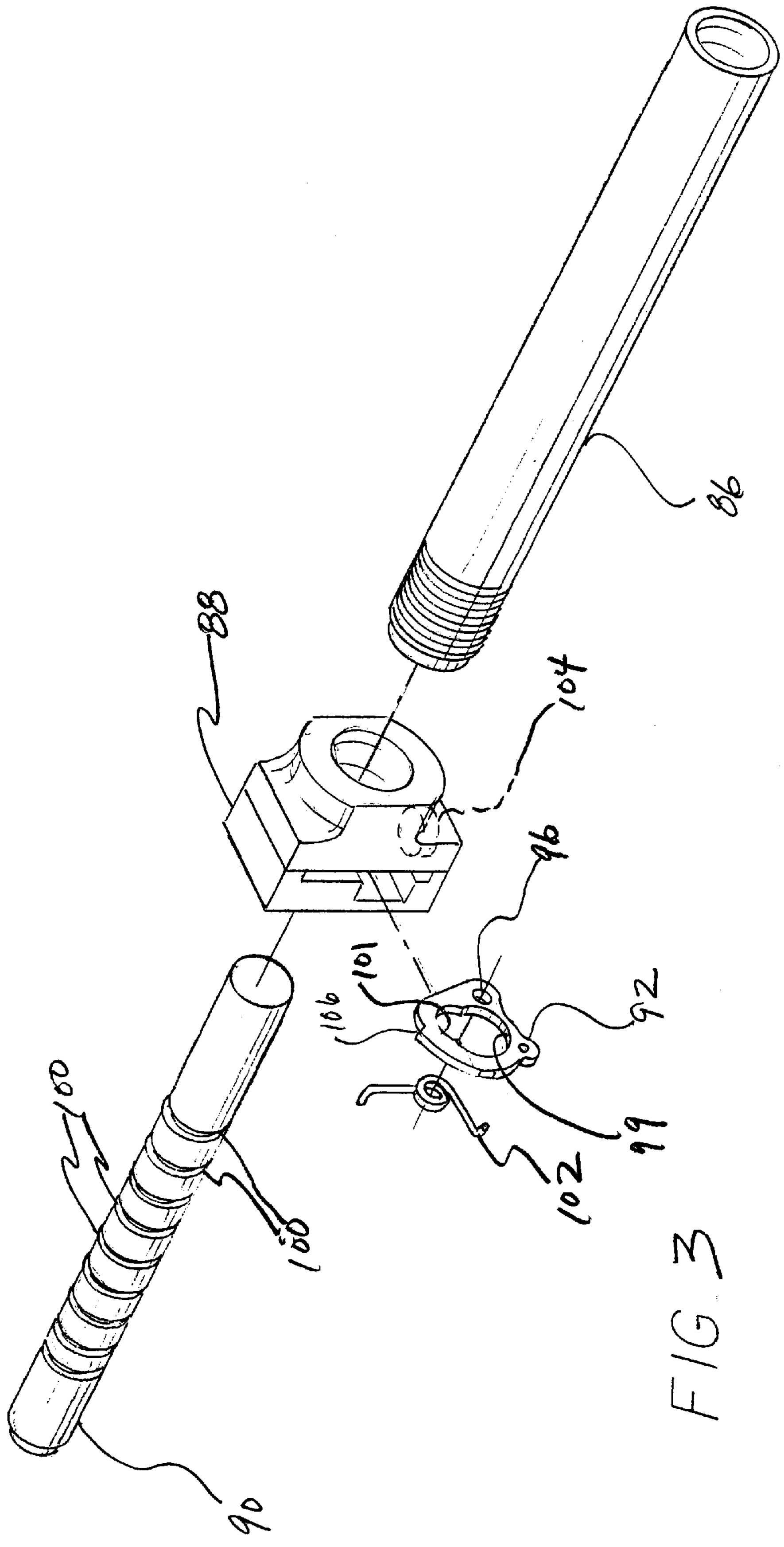
FIG. 3 is an exploded view of the adjustable piston rod of the present invention.
Figure 5:
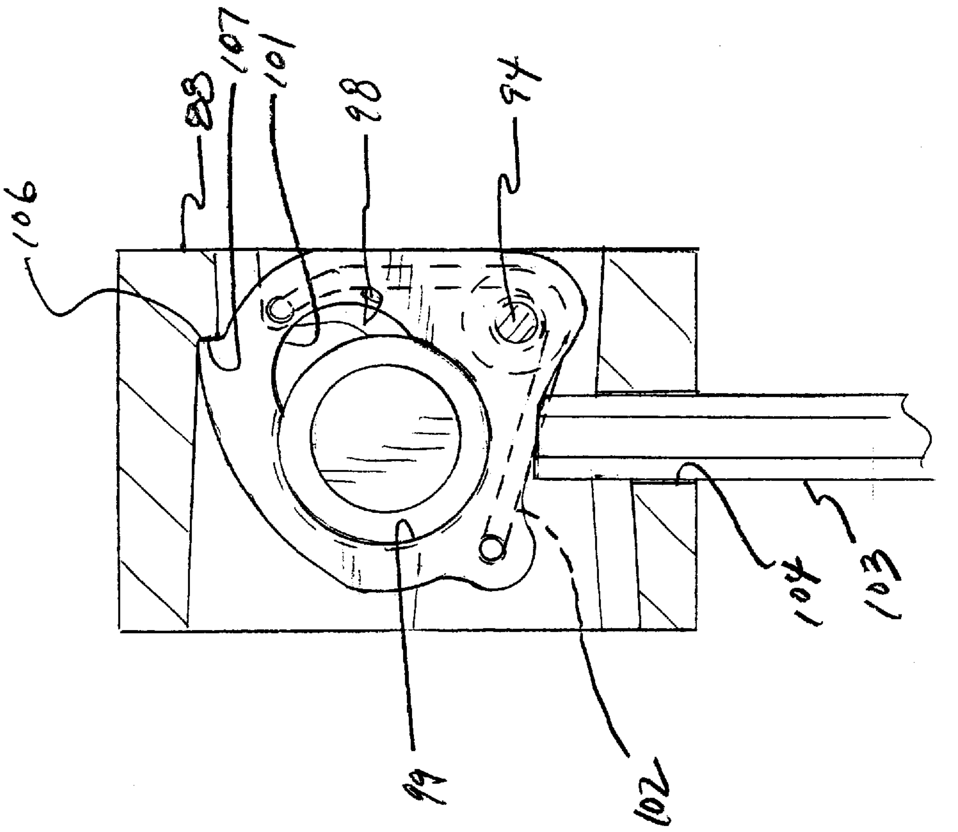
FIG. 5 is a sectional view showing the adjustable piston rod of the present invention in the unlocked position.
Figure 4:
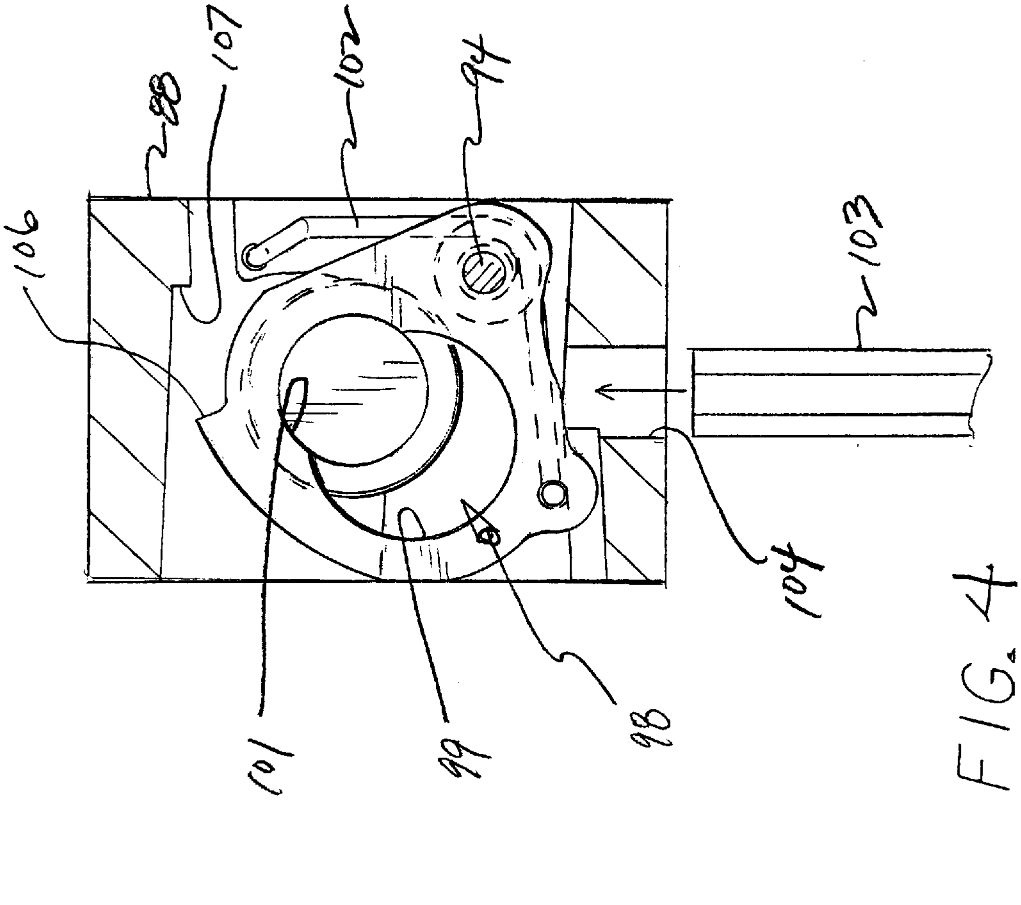
FIG. 4 is a sectional view showing the adjustable piston rod of the present invention in the locked position.

In order to adjust the length of the piston rod 10 and consequently adjust the angle in which the clamp arm 18 rotates, the piston rod 10 provides an elongated member having first and second portions 90, 86, respectively, that are telescopically adjustable along the longitudinal axis 32 of the piston rod 10, as best seen in FIGS. 3–5. The second portion 86 is fabricated from a tubular, hollow shaft having one of its ends connected to the piston 13 of the linear actuator 14 and the other of its ends threadingly received by a block or cam housing 88. The first portion 90 of the piston rod 10 is fabricated from a substantially cylindrical solid rod that extends through the block 88 and is telescopically received within hollow shaft 86. The opposite end of the cylindrical rod 90 is connected to rod end 38.

To releasably lock the cylindrical rod 90 to the hollow shaft 86, the piston rod 10 provides a cam 92 that is pivotally connected to a pivot pin or post 94 mounted within a recessed area of block 88. The pivot pin 94 extends through an aperture 96 provided in the cam 92 wherein the cam 92 is also housed within the recessed area of the block 88. The cam 92 provides an aperture 98 extending therethrough for receiving the cylindrical rod 90. The aperture 98 is formed by two overlapping substantially circular apertures or arcuate portions having different radii. The larger arcuate portion 99 of aperture 98 allows the cylindrical rod 90 to freely pass through the cam 92 whereas the smaller arcuate portion 101 of aperture 98 is designed to cooperatively engage the substantially circular recesses 100 that are formed on and longitudinally spaced along the outer surface of the rod 90.

To maintain engagement of the cam 92 with the circular recesses 100 of the rod 90, the cam 92 is biased against the cylindrical rod 90 by a torsional spring 102 having one of its ends connected to the block 88 and another of its ends connected to cam 92. The spring 102 is also housed within the recessed area of the block 88. The mid-portion of the spring 102 has a coiled portion forming a substantially cylindrical, tubular shape. The coiled portion of the spring 102 receives pivot pin 94 to further support the spring 102 and to maintain the cam 92 on the pivot pin 94 as the cam 92 lies between the coiled portion of the spring 102 and a wall of the block 88. The spring 102 biases the cam 92 so that the smaller portion 101 of aperture 98 maintains engagement with one of the cylindrical recesses 100 on the outside surface of the cylindrical rod 90. When the smaller arcuate portion of aperture 98 is seated within a recess 100 of the cylindrical rod 90, the rod 90 is prevented from moving telescopically relative to the hollow shaft 86. When the cam 92 is pivoted against the bias of torsional spring 102, the cylindrical rod 90 is disposed within the larger arcuate portion 99 of aperture 98 thus allowing rod 90 to move telescopically relative to the hollow shaft 86.

In operation, a user (not shown) utilizes the adjustable piston rod 10 when he/she decides to change the rotational angle of the clamp arm 18. As previously discussed, the user may adjust the rotational angle of the clamp arm 18 by adjusting the length of the piston rod 10. As seen in FIGS. 2–5, access to the piston rod 10 is gained by inserting a small tool 103 into an aperture 105 provided in a wall of the housing 16 of the rotary clamp 12 when the rotary clamp 12 is in the unclamped position, that is, when the linear actuator 14 is fully retracted. When not in use, the aperture 105 may be plugged by a fastener 107. The aperture 105 in the clamp housing 16 correspondingly aligns with an aperture 104 provided in the block 88 of the piston rod 10 when the rotary clamp 12 is in the clamped position. The aperture 104 is in communication with the recess provided in block 88.

To engage and pivot the cam 92 against the bias of spring 102, the tool 103 is inserted through the aperture 105 in the clamp housing 16 and through the aperture 104 in the block 88. The tool 103 engages the cam 92 and pivots the cam 92 against spring 102 The cam 92 has a small shoulder 106 that engages a corresponding shoulder 107 provided on the inside of the block 88 to act as a positive stop in preventing the cam 92 from pivoting beyond a predetermined position. When the cam 92 is pivoted against the bias of spring 102, the larger arcuate portion 99 of aperture 98 receives cylindrical rod 90 so that the rod 90 is free to move telescopically relative to hollow shaft 86. This establishes the "unlocked position" of the piston rod 10, as shown in FIG. 5. To adjust the length of the piston rod 10, the user simply rotates the clamp arm 18 while maintaining engagement of the cam 92 against the bias of spring 102 until the user determines the angle in which he wishes the clamp arm 18 to rotate. Upon determining the proper length of the piston rod 10 and the desired starting rotational position of the clamp arm 18, the user removes the tool 103 and releases the cam 92 so that the portion of cam 92 that defines the smaller portion 107 of aperture 98 may engage the closest circular recess 100 on the cylindrical rod 90. This establishes the "locked position" of the piston rod 10, as shown in FIG. 4. If the cam 92 is not properly aligned with one of the recesses 100 on the rod 90, then the clamp arm 18 may be slightly rotated until the cam 92 engages one of the recesses 100. The rotary clamp 12 is then ready to be utilized.

While the invention has been described in connection with what is presently considered to be the most practical and preferred embodiment, it is to be understood that the invention is not to be limited to the disclosed embodiments, but to the contrary, is intended to cover various modifications and equivalent arrangements included within the spirit and scope of the appended claim. The scope is to be accorded the broadest interpretation so as to encompass all such modifications and equivalent structures as is permitted under the law.

What is claimed is:

1. A linear actuator comprising:

an elongated member having opposite ends wherein one of said opposite ends is connectable to a piston and the other of said opposite ends is connectable to a linkage assembly of a clamp, wherein said elongated member is adjustable along a longitudinal axis of said elongated member;

cam means, coupled to said elongated member, for releasably locking said elongated member into a predetermined position along said longitudinal axis; and wherein said releaseable cam means provides a cam having an aperture extending therethrough for receiving a first portion of said elongated member, and said cam movably coupled to a second portion of said elongated member between a locked position, wherein said cam cooperatively engages said first portion of said elongated member to lock said elongated member into said predetermined position, and in unlocked position, wherein said cam disengages said first portion of said elongated member to freely adjust said elongate along its longitudinal axis.

2. The linear actuator stated in claim 1, further comprising:

a spring having one end connected to said cam and another end coupled to said second portion of said elongated member to bias said cam toward said locked position.

3. The linear actuator stated in claim 2 in combination with a rotary power clamp, comprising:

said clamp having a housing for housing said linkage assembly and said cam, and said housing having a wall with an aperture extending therethrough for accessing and disengaging said cam from said locked position without having to disassemble said clamp.

4. A linear actuator comprising:

an elongated member having the first and second portion wherein said first portion is connectable to a linkage assembly of a clamp, and said second portion is connectable to a piston wherein said elongated member is adjustable along a longitudinal axis of said elongated member;

a cam movably connected to said second portion of said elongated member for movement between a locked position, wherein said cam cooperatively engages said first portion of said elongated member to releasably lock said elongated member into a predetermined position along said longitudinal axis, and an unlocked position, wherein said cam disengages said first portion of said elongated member to allow said elongated member to adjust along said longitudinal axis;

said first and second portions of said elongated member are telescopically adjustable along said longitudinal axis; and said second portion of said elongated member having a cam housing in a shaft wherein said cam housing is connected to said shaft;

a pivot pin connected to said cam housing or pivotally receiving said cam; and a spring having its ends connected to said cam housing in said cam to bias said cam towards said locked position.

5. The linear actuator stated in claim 4, further comprising:

said cam housing having an aperture extending therethrough, and said aperture being substantially perpendicular to said longitudinal axis of said elongated member to provide access to said cam for moving said cam toward said unlocked position.

6. A linear actuator comprising:

an elongated member having a first and second portion wherein said first portion is connected to a linkage assembly of a clamp, and said second portion is connectable to a piston wherein said elongated member is adjustable along a longitudinal axis of said elongated member, a cam movably connected to said second portion of said elongated member for movement between a locked position, wherein said cam cooperatively engages said first portion of said elongated member to releasably lock said elongated member into a predetermined position along said longitudinal axis, and an unlocked position, wherein said cam disengages said first portion of said elongated member to allow said elongated member to adjust said longitudinal axis; and said cam having an aperture extending there through for receiving said first portion of said elongated member, and said aperture formed by first arcuate portion corresponding to said locked position, and a second arcuate portion corresponding to said unlocked position, wherein said second arcuate portion is larger than said first arcuate portion.

7. The linear actuator stated in claim 5 in combination with a power clamp comprising:

said power clamp having a clamp housing for receiving said cam housing, and said clamp housing having a wall with an aperture extending therethrough for corresponding alignment with said aperture in said cam housing to provide access to and disengage said cam without disassembling said power clamp.

8. A linear actuator comprising:

an elongated telescopic member having a first portion connectable to a power clamp, and a second portion connectable to a piston, and said telescopic member telescopically adjustable along a longitudinal axis of said telescopic member;

a cam pivotally connected to said second portion of said telescopic member for movement between a locked position, wherein said cam cooperatively engages said first portion of said telescopic member to releasably lock said telescopic member in a predetermined position, and an unlocked position, wherein said cam disengages said first portion of said telescopic member to allow said telescopic member to telescopically adjust along said longitudinal axis;

a spring having one of its ends connected to said second portion of said telescopic member and the other of its ends connected to said cam to bias said cam toward said locked position; and said cam having an aperture extending therethrough for receiving said first portion of said telescopic member, and said aperture having a first arcuate portion for receiving said first portion of said first telescopic member and said locked position, and second arcuate position for receiving said first portion of said telescopic member in said unlocked position, wherein said first arcuate portion is smaller than said second arcuate portion.

9. A linear actuator comprising:

an elongated telescopic member having a first portion connectable to a power clamp, and a second portion connectable to a piston, and said telescopic member telescopically adjustable along a longitudinal axis of said telescopic member;

a cam pivotally connected to said second portion of said telescopic member for movement between a locked position, wherein said cam cooperatively engages said first portion of said telescopic member to releasably lock said telescopic member in a predetermined position, and an unlocked position, wherein said cam disengages said first portion of said telescopic member to allow said telescopic member to telescopically adjust along said longitudinal axis;

a spring having one of its ends connected to said second portion of said telescopic member and the other of its ends connected to said cam to bias said cam towards said locked position; and said second portion of said telescopic member having a cam housing and a shaft wherein said cam housing has a threaded aperture extending therethrough for threadingly receiving said shaft; and said cam housing having a sidewall with an aperture extending therethrough at an angle substantially perpendicular to said longitudinal axis to provide access to said cam for movement of said cam towards said unlocked position.

10. A linear actuator comprising:

an elongated member having opposite ends wherein one of said opposite ends is connectable to a piston and the other of said opposite ends is connectable to a linkage assembly of a clamp, wherein said elongated member is adjustable along a longitudinal axis of said elongated member; and a cam having an aperture extending threrethrough for receiving said elongated member and for releasably locking said elongated member into a predetermined position along said longitudinal axis.

* * * * *